Sept. 17, 1968 R. JACOBI ET AL 3,402,084
METHOD FOR SEALING SPACING MEMBERS IN A DOUBLE OR MULTIPLE GLASS PANE ASSEMBLY TO THE MARGINS OF THE GLASS PANES
Filed March 24, 1966
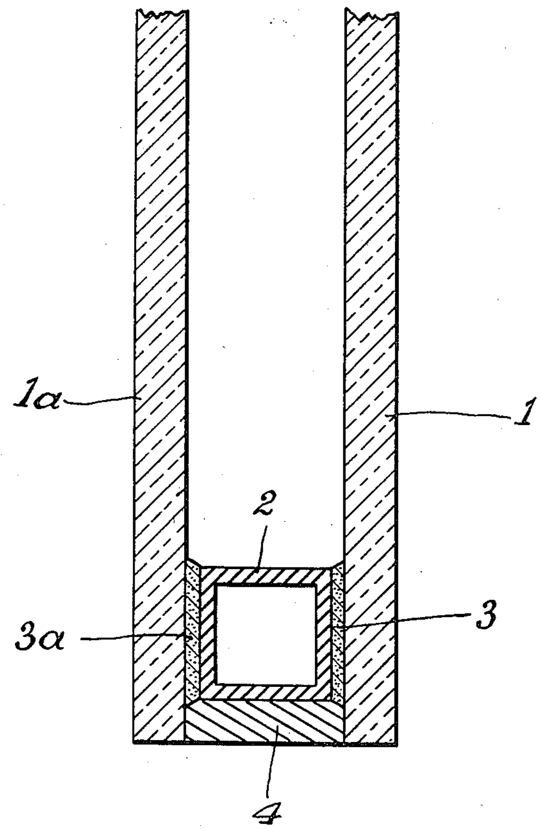

United States Patent Office 3,402,084

Patented Sept. 17, 1968

3,402,084
METHOD FOR SEALING SPACING MEMBERS IN A DOUBLE OR MULTIPLE GLASS PANE ASSEMBLY TO THE MARGINS OF THE GLASS PANES

Richard Jacobi, Wernberg-Unterkoblitz, and Richard Stahl, Rudolf Quenett, Josef Achhammer, and Ernst Merkel, Unterkoblitz, Germany, assignors to Deutsche Fafelglas Aktiengesellschaft Detag, a corporation of Germany Filed Mar. 24, 1966, Ser. No. 537,079
Claims priority, application Germany, Dec. 28, 1965, D 49,034
11 Claims. (Cl. 156—109)

The present invention relates to a method for sealing the spacing member in a double or multiple glass pane structure to the margins of the glass pane by means of a layer of an adhesive substance with a content of between 3 to 10%, preferably 5 to 8%, of a water repellent solvent and in which a plastified elastic cement having a synthetic rubber base is used.

For uniting the spacing profile or spacing member with the margins of the panes an elastic cement made of a synthetic rubber base plastified with about an amount of 70% a solvent has given extraordinarily satisfactory results, because with such a cement a very effective steam or water vapor barrier is being attained, particularly then when a sufficiently high residual solvent content remains in the cement.

The production of such type of sealed or cemented double glass pane structures requires, however, a great amount of time and space, because the panes after application of the layer of adhesive containing 70% of a solvent have to dry for a long period of time prior to the engagement of the margins of the panes with the spacing members and for a subsequent mechanical clamping operation, which requires an additional drying operation. For this reason, a total period of time of at least 16 hours, but normally 24 hours, is necessary until the solvent content of 3 to 10%, preferable 5 to 8%, necessary for the attainment of an effective water steam barrier has been reached. Only after all this, the double pane structure can be completed, if desired by an application of a further outer sealing means.

This known method in addition to the great expenditure of time has the further disadvantage that the rooms in which the cement is applied and is caused to dry are filled with strong solvent vapors, particularly with benzene vapors, and special safety precautions have to be taken for an efficient protection against explosion and for the maintenance of the health of the working personnel.

It is an object of the present invention to overcome these disadvantages of the known methods and to simplify the application of the layer of the adhesive substance which must have a solvent content necessary for the attainment of a good adhesion and a property which prevents an outward diffusion of the solvent as much as possible.

The invention consists in the initial employment of a cement containing about an amount of 70% solvent which is brushed on a preferably strip-like foil of synthetic material, for example, made of polyvinylalcohol, whereupon the cement is permitted to dry to a solvent content of 3 to 10%, but preferably 5 to 8%. This partially dried adhesive layer is then pressed with the carrier foil against one of the surfaces of the double or multiple glass pane to be united, and after removal of the foil is brought into contact with one side of the spacing profile. All percentages mentioned in the foregoing and hereinafter are by weight.

Owing to application by brushing of the elastic cement containing about 70% solvent upon a strip-like foil of synthetic material, the period of time normally required for the drying of the cement after its application may be dispensed with, so that this period of drying time is saved from the actual production process of multi-pane glass structures and may be shifted to the completion of the adhesive layer strip which is much simpler and which requires much less space and which permits the attainment of the desired degree of dryness in a continuous method. The method according to the present invention results in a great saving of time in the production of the double glass pane structures and in addition results in a saving of space for the completion of the panes, because no longer are required any special storage rooms for the storage of the panes for the 24 hours heretofore necessary before the glass panes could be united to form multi-pane structures. At the same time, the transportation devices necessary for the storage may also be dispensed with. Furthermore, the working in an atmosphere filled with solvent vapors is prevented as well as the danger of an explosion due to the ignitability of the solvent vapors.

If the cement applied to the foil of synthetic material on account of a longer storage should have its solvent content reduced to such an amount that it is no longer sufficient for the desired adhesion, then the adhesive layer may be subjected prior to its application to the surfaces of the double and multiple glass pane to be united such a long period of time to the action of the solvent or solvent vapors until the solvent content in the adhesive layer has again attained an amount of at least 3%, preferably 5 to 8%.

In order to prevent an escape of the solvent after assembly of the pane structure, a solvent mixture is used to advantage which contains in addition to the low boiling portions other higher boiling point-portions in the amounts of 3 to 10%, preferably 5 to 8%. This method has the advantage that according to the particular spacing member or spacing profile used, one may use a higher boiling solvent with which the most favorable adhesive properties will be attained, so that after the assembly of the pane structure an optimum adhesive force is obtained.

If a spacing profile made of lead is utilized, it is of advantage for an increase in the adhesion to utilize a solvent mixture which contains 3 to 10%, preferably 5 to 8% of a high boiling benzene hydrocarbon.

In the event, however, that the spacing profile consists of a glavanized steel profile, a particularly good adhesion is obtained when as a solvent a low-viscous softener is used which is not miscible with water, such as for example di (2 ethylhexyl) adipat.

A particularly good and rapid adhesion is obtained by employing a high frequency heating of the surfaces and the adhesive layer to be united with one another.

In order to prevent an outward diffusion of the solvent, the adhesive layer is preferably applied at such a distance from the edge of the pane that a gap remains, which may be filled with a layer which is impervious to the solvent.

The marginal zone of the adhesive layer lying toward the outside may, however, be made previously impervious to the solvent vapor by means of a lacquer or other protective coating.

EXAMPLE I

Upon a strip-like foil of a synthetic material made of polyvinylalcohol is applied by means of a slit nozzle, a medium-polymer plastified synthetic rubber adhesive containing about 70% of benzene in a thickness of 1.50 to 2.00 mm. and this foil is then moved for the purpose of causing an evaporation of the solvent through a drying chamber. After a completely blister-free drying of the adhesive to a low solvent content the adhesive coated strip may be rolled up and stored.

Prior to use the strip is moved, if need be, through a channel in which it is subjected to the vapors of a solvent, such as benzene having a boiling point of 60 to 150° C. for such a period of time as is necessary to produce in the adhesive layer a solvent content of 3 to 10%, preferably 5 to 8%. The layer of adhesive substance disposed on the polyvinylalcohol foil is now pressed either upon margins of the pane or upon the spacing profile, and thereupon the polyvinylalcohol foil is stripped off, so that a layer of an adhesive substance of completely uniform thickness is obtained which during its application was neither distorted nor has slipped out of place. By its union with the countersurface and the pressure against the spacing profile against the margins of the panes an absolutely safe sealing of the double or multiple glass pane structure respectively is obtained.

EXAMPLE II

Upon a strip-like foil of a synthetic material made of polyethylene is applied by means of a slit nozzle, a medium polymer synthetic rubber adhesive containing about an amount of 70% solvent in a thickness of 1.50 mm. The solvent mixture contained in the synthetic rubber adhesive consists of up to 60% benzene having a boiling point of 60 to 150° C. to which as high-boiling solvent a low-polymer softener is added having an adipinic acid ester base. For the purpose of evaporation of the solvent the strip-like foil of synthetic material is conveyed through a drying chamber in which substantially the benzene is evaporated. After a completely blister-free drying of the layer of adhesive substance to a low solvent content, which consists substantially of the low-polymeric softener having a base of an adipinic acid ester, the adhesive coated strip-like foil of synthetic material is rolled up and may be stored.

For use, the layer of adhesive substance disposed on the foil of polyethylene is pressed either against the margins of the glass pane or against the spacing profile, the latter consisting preferably of galvanized steel sheet, whereupon the polyethylene foil is stripped off, so that the layer of adhesive substance of completely uniform thickness remains on the spacing profile. The layer of adhesive substance does not distort during its application to the glass pane or the spacing profile. The unification with the countersurface and the pressing together of the spacing profile and pane margins produces an absolutely secure sealing of the panes with the galvanized steel profile. If as a result of a very long storage or during the assembly operation the content of the high boiling solvent or the low-polymer softener should become too low, then before use the adhesive coated strip is conveyed through a bath of solvent until the layer of adhesive substance has again attained a solvent content of 3 to 10%, preferably 5 to 8%, and then the procedure of combining the respective parts takes place in the same manner as already described.

The single figure of the drawing illustrates by way of example a sectional view of a portion of a multi-glass pane structure of the invention. The spaced parallel glass panes 1 and 1*a* are provided at the marginal areas facing each other with a layer of an adhesive 3 and 3*a*, respectively, which in turn engages the adjacent side walls of the tubular spacing profile 2. The groove formed along the edges of the structure is filled with an adhesive cover layer 4 which is impervious to the solvent in the layer 3 and thereby protects the same. The cover layer 4 may consist of sodiumtetrasulfide and ethylenedichloride known under the trade name "Thiokol" or of silicone caoutchoucs.

What we claim is:

1. A method for sealing the spacing member in a multiple glass pane structure to the margins of the glass pane by means of an adhesive substance comprising an elastic cement having a synthetic rubber base plastified with about 70% of a water-repellent solvent, comprising the steps of firstly applying a layer of said adhesive substance on a strip-like foil of synthetic material, drying said layer of adhesive substance so that said solvent content is reduced to an amount of 3 to 10%, then pressing the layer of adhesive substance dried in the mentioned manner while still on said carrier foil against one of the surfaces of the multiple glass pane structure, removing said foil from said layer of adhesive substance on said surface, and bringing said layer of adhesive substance into contact with one of the surfaces of said spacing member.

2. A method according to claim 1, in which the solvent content in said layer of adhesive substance is reduced by said drying to an amount of 5 to 8%.

3. A method according to claim 1, in which said strip-like foil is made of polyvinylalcohol.

4. A method according to claim 1, including the step of subjecting said strip-like foil with said layer of adhesive substance thereon to the action of said solvent until the solvent content of said adhesive substance has been increased to at least 3% in the event said solvent content became reduced below this amount before the layer of adhesive substance is applied by pressing it to one of said surfaces of the multi-glass pane structure.

5. A method according to claim 1, including the step of subjecting said strip-like foil with said layer of adhesive substance thereon to the action of said vapors of said solvent until the solvent content of said adhesive substance has been increased to at least 3% in the event said solvent content became reduced below this amount before the layer of adhesive substance is applied by pressing it to one of said surfaces of the multi-glass pane structure.

6. A method according to claim 1, in which said amount of about 70% of a water-repellent solvent in said elastic cement contains an amount of 3 to 10% of a higher boiling point solvent.

7. A method according to claim 1, in which for the sealing of a spacing member made of lead in a multi-glass pane structure an adhesive substance is employed which contains 3 to 10% of a higher boiling benzene hydrocarbon.

8. A method according to claim 1, in which for the purpose of increasing the adhesive power of said layer of adhesive substance to a spacing member made of galvanized steel a cement is used whose solvent contains a low-viscous softener which is non-miscible with water, such as di(2-ethylhexyl)adipat.

9. A method according to claim 1, in which said drying of said layer of adhesive substance is effected by a high frequency heating operation.

10. A method according to claim 1, in which said layer of adhesive substance is arranged at a distance from the edge of the glass pane to the marginal surface of which said layer is applied so as to prevent an outward diffusion of the solvent in said adhesive substance and to provide a gap for permitting the sealing with cover layer impervious to the vapors of the solvent in said layer of adhesive substance.

11. A method according to claim 10, including the step of sealing the outer edge of the layer of adhesive substance with a protective cover which is impervious to the vapors of the solvent in said adhesive substance.

References Cited

UNITED STATES PATENTS 2,030,869 2/1936 Haven ---------------- 52—616
2,974,377 3/1961 Kunkle ---------------- 52—616

JOHN E. MURTAGH, *Primary Examiner.*